Sept. 8, 1925.                                                          1,553,283
                          J. BENNETT
              PROCESS OF TREATING GLASS DURING ANNEALING
                        Filed May 22, 1924
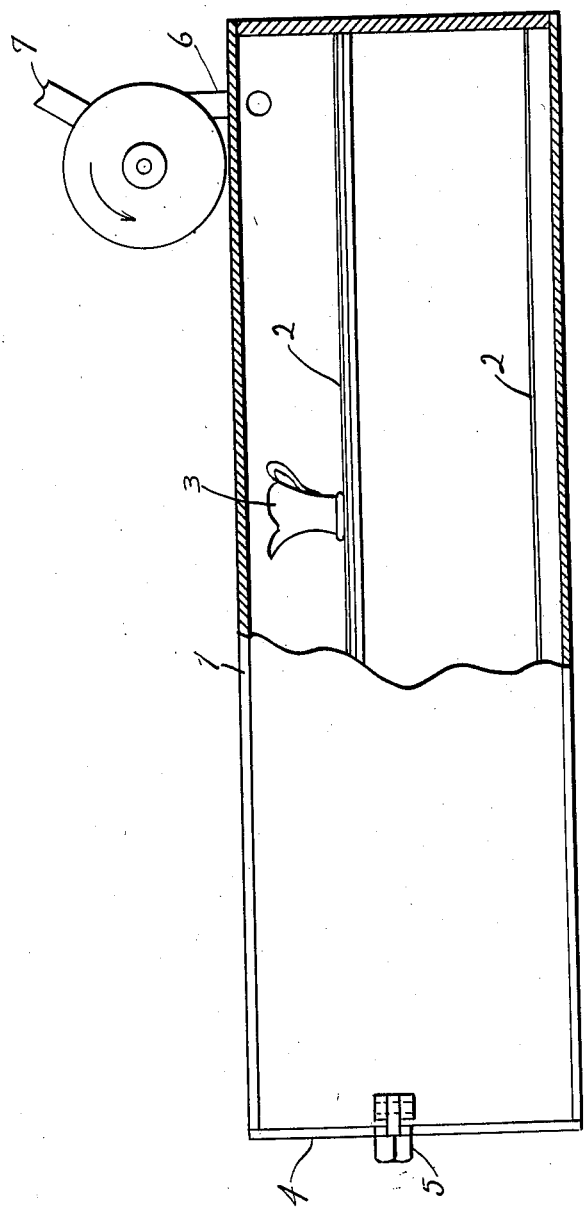
Inventor
John Bennett
By W. W. Williamson Patented Sept. 8, 1925.

1,553,283

UNITED STATES PATENT OFFICE.

JOHN BENNETT, OF STEUBENVILLE, OHIO.

PROCESS OF TREATING GLASS DURING ANNEALING.

Application filed May 22, 1924. Serial No. 715,049.

*To all whom it may concern:*

Be it known that I, JOHN BENNETT, a citizen of the United States, residing at Steubenville, in the county of Jefferson and State of Ohio, have invented new and useful Improvements in a Process of Treating Glass During Annealing, of which the following is a specification.

My invention relates to a new and useful improvement in the process of treating glass during annealing, and has for its object to increase the thermal endurance and mechanical strength of glass articles, either pressed, rolled, cast, blown or otherwise shaped or formed by rarefying the air in contact with such article while they are cooling whereby the temperature of the glass will be retained to a greater length of time and will be equalized throughout the mass and also facilitating the escape of gases from the hot glass.

In order that those skilled in the art to which this invention appertains, may understand how to make and use the same, I have shown one form of apparatus in the accompanying drawing for carrying the method into effect, but as the apparatus forms no part of my present invention the particular details thereof will not be entered into.

In the accompanying drawing, 1 represents an annealing receptacle of any suitable dimensions here shown as having tracks or supporting trays 2 therein for supporting glass or glass articles as indicated at 3 and this receptacle is provided with a cap 4 adapted to be closed upon the open end of the receptacle by any suitable fastening means such as a swinging bolt 5 so as to produce an air tight joint. This receptacle may be a part of an annealing furnace or it may be a separate apparatus and provided with facilities for loading and unloading or a series of separate receptacles may be arranged in circular form to operate in conjunction with the producing method.

Communicating with the interior of the receptacle 1 is an exhaust pipe 6 coupled to any suitable exhaust means such as a fan or exhaust pump 7 whereby a partial vacuum may be produced within said receptacle. The glass or glass articles to be treated are placed within the receptacle while hot, the latter closed air tight and a portion of the air exhausted from this receептacle thus lessening the atmospheric pressure upon the articles therein thereby permitting the expansion of the glass and retarding the cooling of the same, permitting the equal distribution of the heat during the cooling process and facilitating the liberation of the gases from the glass, which gases are also drawn from the chamber by the continuance of the exhausting process.

I have found in practice that glass or glass articles cooled somewhat below the critical point in annealing under partial vacuum entirely eliminates the strains and stresses which are usually incident in producing this class of work and especially where irregular shaped articles having portions thereof of different thicknesses.

In utilizing my process the transfer of the glass or glass articles to the receptacle should be done before the same have fallen in temperature to the critical point and should this be inconvenient in certain classes of work the glass may be reheated or under certain working conditions the receptacle in which the articles are placed for annealing may be provided with means for heating the entire receptacle including the articles contained therein after the manner of an annealing furnace.

Having thus fully described my invention, what I claim as new and useful is:—

1. The herein described process of treating glass during annealing consisting of placing said glass while hot in an air tight receptacle and exhausting the air from said receptacle.

2. The process of treating glass consisting in confining said glass while hot in an air tight receptacle and exhausting the air and gases from said receptacle.

3. The process of annealing glass consisting in raising the temperature thereof above the critical point and then cooling said glass in a partial vacuum.

In testimony whereof I have hereunto affixed my signature.

JOHN BENNETT.